United States Patent Office 3,485,098
Patented Dec. 23, 1969

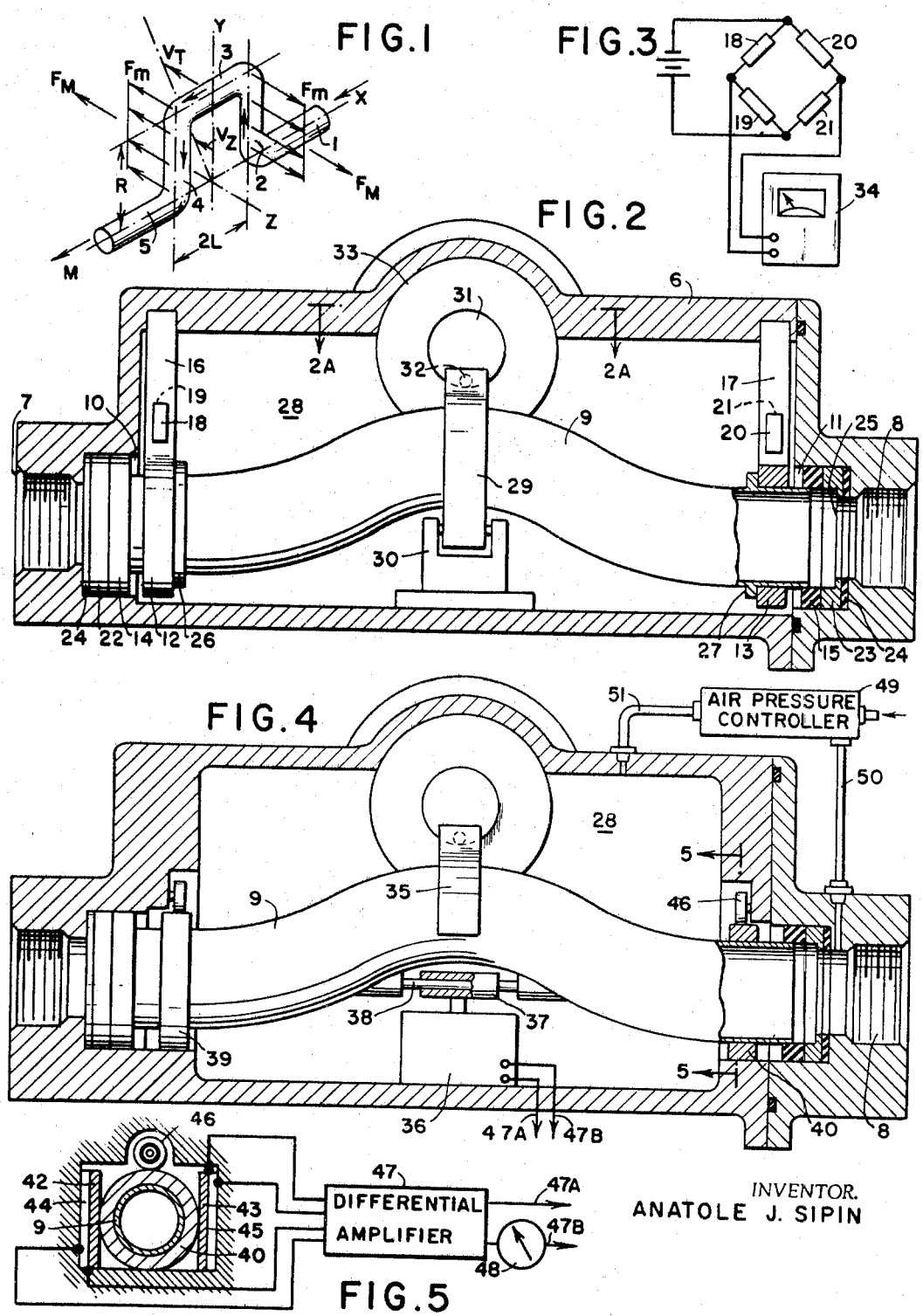
INVENTOR.
ANATOLE J. SIPIN

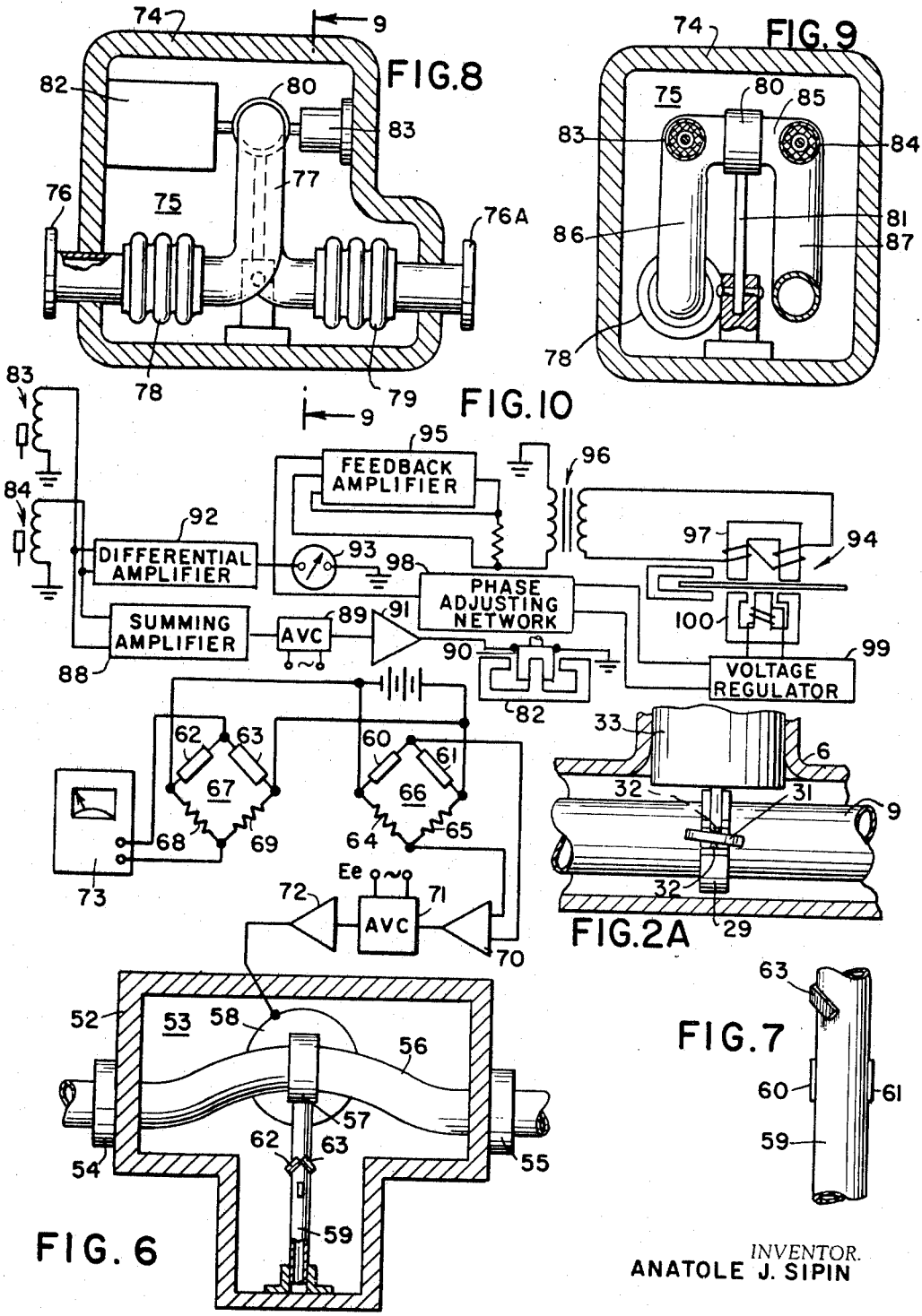

3,485,098
MASS FLOW METERING MEANS
Anatole J. Sipin, 117 E. 77th St.,
New York, N.Y. 10021
Original application Sept. 3, 1964, Ser. No. 394,265, now Patent No. 3,355,944, dated Dec. 5, 1967. Divided and this application Oct. 31, 1967, Ser. No. 706,733
Int. Cl. G01f 1/00
U.S. Cl. 73—194                              1 Claim

ABSTRACT OF THE DISCLOSURE

A mass flowmeter of the Coriolis type, in which a curved conduit with a flow path in a plane orthogonal to the axes of inlet and outlet ports is vibrated to impart transverse angular momentum to the flowing matter, and the Coriolis force coupled on the conduit is sensed to provide a measure of mass flow.

---

This application is a division of application Ser. No. 394,265, filed Sept. 3, 1964, for Mass Flow Metering Means, now Patent No. 3,355,944.

This invention relates to a means of the Coriolis type for metering the mass flow of fluent matter such as liquids, gases and fluent solid material. The device requires no revolving parts in the flow path.

There is widespread need for a metering device of this character that operates with minimum resistance to the flow without moving parts within the flow stream that could be attacked or could contaminate the flowing material. In the chemical process industries, for example, it is frequently necessary to combine corrosive fluids in accurately maintained weight ratios. In aircraft flight refueling, it is advantageous to measure the weight of fuel transferred at very high flow rates and very low pressure losses. In the food industry, it is of major importance that the metering device be of such material and construction that the fluid cannot be contaminated or trapped in corners and revolving parts, and that it can be easily cleaned. In the pipeline industry, weight metering of liquids, such at petroleum, is superior to volumetric metering because changes in density due, say, to trapped gases would not introduce weight flow error. Weight metering is advantageous for gaseous fuels because heating values vary with densities. Also, metering of gases must be done at very low pressure drops.

One of the objects of this invention is to provide a device of the Coriolis type for measuring the mass flow of fluids or of fluent solids or of mixtures of these.

Another object of this invention is to provide a metering means with no revolving parts in the flow stream.

A third object of this invention is to provide a metering means with minimal obstruction in the flow path, and minimal resistance to flow.

A further object of this invention is to provide a metering means for rapidly measuring high rates of flow.

Still another object of this invention is to provide metering means with the features described above in a unit of minimal size and weight.

The invention is based on the principle that a fluid flowing through a curved conduit or tube and experiencing a velocity gradient transverse to the flow path will interact with the tube wall with a force directly related to the transverse velocity gradient and the mass flow rate. When the velocity gradient is caused by the transverse rotation of the tube about one end the reaction is known as a Coriolis force. The magnitude and direction of the reaction force depends on the magnitude and direction of the transverse velocity change and the magnitude and direction of the mass flow. If two sections of the tube have the same transverse velocity gradient but opposite directions of flow, a couple, consisting of equal and opposite reaction forces, will result. It is the principle of this invention that such a force couple between two sections of a suitably configured tube be measured as an indication of mass flow rate through the tube. The simplest tube geometry capable of supplying such a couple is shown in the preferred embodiment. Distortions of a tube from a straight path are limited to a bend of 180 degrees or less to minimize or eliminate reversals in flow direction between the inlet and outlet of the meter. Although a flowing "fluid" is described, it is to be understood that the principle holds equally well for fluent solids and mixtures. The features and advantages of several embodiments of the invention will be understood by reference to the following drawings.

In the drawings,

FIG. 1 is a three dimensional diagram of a flow tube section showing vectorial relationships among forces and velocities.

FIG. 2 is a partially sectioned side view of the preferred embodiment.

FIG. 2A is a fragmentary view taken along line 2A—2A of FIG. 2.

FIG. 3 is an electrical schematic diagram of the embodiment shown in FIG. 2.

FIG. 4 is a view similar to FIG. 2 of an embodiment of the invention that includes force feedback means to null the motion of the flow tube.

FIG. 5 is a fragmentary view along line 5—5 of FIG. 4 of one of the bearings and associated force error sensing elements for the flow tube shown in FIG. 4.

FIG. 6 is a sectional view and schematic diagram of another embodiment of the invention in which a flexible flow tube is used and the motion applying member moves in tranlation.

FIG. 7 is a detail of the motion and force sensing elements of the device shown in FIG. 6.

FIG. 8 is a side view of a further embodiment of the invention in part section.

FIG. 9 is a sectional view of the embodiment shown in FIG. 8 along line 9—9, and FIG. 10 is a wiring diagram of the electrical components shown in FIGS. 8 and 9.

The diagram of FIG. 1 shows a conduit or tube with a flow path in the X–Y plane. A fluid enters section 1, flowing in the negative X-direction, is bent clockwise through 90 degrees to flow in a positive Y-direction in tube section 2, is bent counterclockwise to flow in the negative X-direction again in tube section 3, is bent counterclockwise to flow in the negative Y-direction in tube section 4, and is bent clockwise to flow in the negative X-direction again in tube section 5, from which it emerges. Thus the fluid never flows in the positive X-direction and never deviates from the negative X-direction by more than 90 degrees, plus or minus. Stated otherwise the tube is bent or curved in sections within which the geratest change in direction of flow is 180 degrees. The net change in direction of the flow velocity vector between inlet section 1 and outlet section 5 is zero, however.

Assume that tube section 3 experiences a transverse velocity in the Z-direction, $V_T$, so that the fluid flowing in section 2 experiences an increasing gradient of transverse velocity, from zero in section 1 to $V_T$ in section 3, and the fluid flowing in section 4 experiences a decreasing gradient of transverse velocity, from $V_T$ in section 3 to zero in section 5. Assume also that the transverse velocity gradient is constant, that is, the change of transverse velocity is proportional to Y, the distance from the X-axis. Such a condition would prevail if the flow tube were rotated about the X-axis. Letting $V_S$ be the average flow velocity in a flow tube of constant cross-sectional area, $A_S$, a particle of fluid of mass, $m$ in tube section 2 will have a transverse reaction force $$F_m = \frac{d}{dt}(mV_z)$$

where $V_z$ is the velocity in the Z-direction of the tube wall at the particle location. This force can also be expressed as $$F_m = mV_S \left(\frac{dV_z}{dS}\right)$$

where $dS$ is an increment of flow path. $V_z = (V_T/R)y$ as explained above. Also $m = \rho A_S dS$, where $\rho$ = fluid density and $V_S$ is assumed to be constant. By substitution it is easily seen that $F_m = \rho A_S V_S (V_T/R) dy$. The total reaction force, $F_{M2}$, on tube section 2 is the summation of all reaction forces $F_m$, due to individual fluid particles, $m$.

$$F_{M2} = \sum_{y=0}^{y=R} F_M \text{ and } F_{M2} = \rho A_S V_S (V_T/R) \int_0^R dy$$

or $F_{M2} = \rho A_S V_S V_T$ but $\rho A_S V_S$ is equal to the mass flow rate, M; and $F_{M2} = MV_T$. It is seen that the total reaction force on tube section 4, $F_{M4}$, is equal and opposite to $F_{M2}$. Since these two force vectors are separated by a distance 2L, the total reaction moment about the Y-axis is $M = 2LMV_T$; the moment is directly proportional to mass flow rate and the maximum transverse velocity in the tube section. In actual fact the nature of the velocity variation in the Y-direction is not material, since the integrated force is a point function and proportional to the maximum value of transverse velocity, not the velocity gradient, as would be the case for an elementary particle. Therefore, even if the variation of deflection in the Z-direction with displacement in the Y-direction were not linear, as for the rotational case considered, but an exponential function, as, say, if section 2 were fixed at its inlet and deflected as a beam, the expression given above would hold. In the extreme case the principle would hold even if there were discontinuities between sections 1 and 2 and sections 4 and 5, and sections 2, 3 and 4 moved in translation.

The transverse velocity, $V_T$, obviously can be constant, as in a continuous rotation, or fluctuating as in a transverse oscillation of the flow line.

It is not necessary for tube sections 2 and 4 to be orthogonal to the X-axis. It is only necessary that there be a fluid velocity component in the Y-direction due to flow within these passages. Therefore much shallower angles between tube sections 2 and 4 and the X-axis can be used in a practical design. The 90 degree turns in FIG. 1 have been shown as a limiting condition and as a design requiring minimum axial space. Certainly a larger angle than 90 degrees could also be utilized while still preserving a Y-velocity component of flow. But this would involve extreme changes in direction and reversal of flow in the X-direction, which would be contrary to the teaching of the invention.

In the preferred embodiment of the invention shown in FIGS. 2, 2A, and 3 a practical design of a flow tube is used, illustrating the fact that only small angles of deviation from the X-axis are required to produce adequate reaction forces, in this case, plus and minus 20 degrees. Here, the transverse velocity is obtained by lateral oscillation of the flow tube. Referring now to FIG. 2, the metering device includes a housing 6 with coaxial inlet and outlet ports 7 and 8. The ports communicate with the flow tube 9 through cylindrical passages 10 and 11. The flow tube, formed of relatively rigid material, has straight end sections and a symmetrically curved central portion. The end sections are coaxial with ports 7 and 8 and are free to rotate in bearings 12 and 13. The tips of the flow tube are bonded to the inner edges of annular rings 14 and 15, whose outer surfaces mate with the walls of passages 10 and 11. Bearings 12 and 13 are suspended by flat cantilever springs 16 and 17, which permit limited freedom of motion in the transverse direction of oscillation; that is, in a horizontal direction perpendicular to the flow path, as shown in FIG. 2. Strain gages 18 and 19 are mounted on opposite sides of flat spring 16; and strain gages 20 and 21 are mounted on opposite sides of flat spring 17. The function of the strain gages is to measure the reaction forces of the flow tube at bearings 12 and 13. The strain gages are connected electrically in a bridge circuit as shown in FIG. 3. Rings 14 and 15 should have sufficient flexibility so that their distortion due to transverse motion of the flow tube does not cause significant restoring forces in comparison with the restoring forces of the flat springs. They must also be sufficiently flexible to accept the small rotation of the flow tube ends about the horizontal axis without excessive stress. Typically, rings 14 and 15 are made of rubber or a similar material. Flexible rings 14 and 15 are bonded to rigid rings 22 and 23, which seat against the end walls of passages 10 and 11. To effect a good seal, a gasket 24 is placed between the ring face and the wall. The inner diameter of rings 22 and 23 is stepped exposing a pressure area 25 which tends to force the rigid ring against the end wall, keeping the assembly in position and improving the seal. Motion of the flow tube due to axial thrust forces caused by differential pressure acting on the exposed edges at the ends of the flow tube is eliminated by shoulders 26 and 27, which are in contact with bearings 12 and 13. Since the pressure drop through the flow tube at rated flows is small, the axial thrust forces are small. Any axial play of the flow tube would cause the flexible end rings to distort, applying a force in a direction to unseat one of the rigid end rings. But this motion would be very small and the unseating force would be insignificant compared to the pressure force developed on the shoulder of a rigid ring, tending to seat it tightly. Referring to the right end of the flow tube in FIG. 2 it is seen that there is no leakage path for the fluid in the line to enter the central chamber 28 of housing 6. There is also no area of the end rings exposed to line pressure so as to unseat the rigid ring. Pressure is applied radially and in an axial direction to seat the end ring assembly.

Flow tube 9 is connected to a rigid oscillating sleeve 29 at its central section. Sleeve 29 is hinged at its bottom end to support block 30 so that it is free to rotate about an axis defined by the center line of bearings 12 and 13. Therefore the motion of the end sections of flow tube 9 within the bearings due to oscillation of sleeve 29 is in pure rotation. The connection between flow tube and sleeve 29 is through a circumferential row of balls. The construction is similar to that of a ball bearing with shallow races permitting a limited amount of angular motion between the inner and outer races without radial play. Thus the transverse oscillation of the sleeve is completely transmitted to the flow tube, but the flow tube is free to rotate about its vertical center line. Referring now to FIG. 2A it is seen that oscillatory motion in the transverse direction is imparted to sleeve 29 by a disc cam 31 set at an angle with respect to the direction of oscillatory motion. Two ball followers 32 of conventional design, one riding on each face of the cam, are built into the top end of sleeve 29. Cam 31 is fastened to the shaft of a constant speed motor 33 mounted in housing 6.

When there is a force couple applied to bearings 12 and 13 by the flow tube due to oscillation of the mass flow, beams 16 and 17 will deflect in opposite directions and corresponding strain gages on each beam will change resistance values in opposite directions. Thus if the force couple were in a direction to make the resistance of strain gage 18 increase in value, gage 19 would decrease, gage 20 would decrease and gage 21 would increase. As shown in FIG. 3 there would be a voltage output from the strain gage bridge, at the frequency of oscillation with an amplitude directly proportional to mass flow rate. This voltage can be measured by a conventional vacuum tube voltmeter 34 suitably calibrated to indicate mass flow rate. It is to be noted that any forces applied to both bearings in the same direction will not be measured as their effect is cancelled by the arrangement of the strain gage bridge. The improved metering device is symmetrical and will operate equally well for flows in either direction. If the direction of flow is unknown it can be easily ascertained by detecting the phase of the bridge output voltage.

FIGS. 4 and 5 illustrate a modification of the embodiment of the invention shown in FIGS. 2, 2A, and 3. The essential difference here is that the force couple due to oscillation of the mass flow is balanced by a moment from a torque motor to reduce the motion of the flow tube about its vertical center line, as sensed at the tube end bearings, to substantially zero. Except for the tube driving member, the torque motor and attachment and the tube end bearings, the structure is substantially the same as that shown in FIG. 2. The driving member 35 is now rigidly fastened to the flow tube; and it does not extend below the tube so as not to interfere with the torque motor. The torque motor 36 applies a balancing moment about the vertical center line to flow tube 9 through a sleeve 37 attached to the armature of the torque motor, and a shaft 38 attached to the flow tube. Shaft 38 fits snugly but is free to rotate within sleeve 37. Sleeve 37 and shaft 38 are coaxial with the center line of flow tube end bearings 39 and 40 which is the same as the horizontal axis of rotation or the oscillation axis. FIG. 5 shows a section through the center of bearing 40. The flow tube is free to rotate within the bearing, which is restrained from rolling laterally by plates 42 and 43 that abut against piezoelectric elements 44 and 45. The purpose of plates 42 and 43 is to distribute the reaction load evenly over the surfaces of the piezoelectric elements. When a force couple is present due to the oscillation of mass flow in the tube, bearing 40 attempts to roll back and forth in the transverse direction, alternately compressing piezoelectric elements 44 and 45. Bearing 40 is restrained in the vertical direction by ball bearing roller 46. The self-generated output voltages of the piezoelectric elements are fed to a high gain differential amplifier 47, whose output is an alternating current at oscillation frequency with an amplitude proportional to the bearing reaction force and a phase depending on the direction of the reaction force with respect to the oscillatory motion. The output current is fed to torque motor 36, through leads 47A and 47B. The torque motor applies a moment in a direction to null the generated voltages of the piezoelectric elements; and, therefore, the actual motion of the flow tube about its vertical center line. The current supplied to the torque motor is measured by ammeter 48 as an indication of the restoring moment, hence mass flow rate.

It is not essential to have force sensing elements at each of the flow tube end bearings as long as the restraint of the non-sensing bearing is significantly more flexible than that of the sensing bearing. However, it is desirable to have the same sensing elements at both bearings so as to equalize restraints and to eliminate the effects of parallel forces at the bearings, as shown in FIGS. 2 and 3. FIGS. 4 and 5 show force sensing elements only at the right tube bearing for the sake of clarity; but it is to be understood that sensing elements can also be included at the left bearing without affecting the essential operation of the embodiment.

In devices of this type with flexible connections at the end of a flow tube, pressure equalization across connections help to stabilize the calibartion by eliminating zero shifts and changes in sensitvity. An air pressure controller 49 is shown in FIG. 4. It receives a fluid pressure from port 8 through tube 50 and supplies a corresponding air pressure to chamber 28 through tube 51 so as to keep the pressure across rings 14 and 15 at zero or a low value.

FIGS. 6 and 7 illustrate a modification of the embodiment of the invention shown in FIGS. 2 and 3. Here, a flow tube of relatively flexible material is utilized; and the force sensitive tube end bearings are eliminated. The tube oscillation driving member moves in translation, rather than rotation about the horizontal axis; and the mass flow reaction is sensed by a torque tube, deflecting rotationally about the vertical axis.

In the equations derived from FIG. 1, it was stated that the transverse velocity of section 3 of the flow tube was $V_T$, and that the integrated reaction force was proportional to $V_T$. More correctly, $V_T$ is the average transverse velocity of section 3; but as long as the flow velocity distribution in section 3 is symmetrical in the Y-direction, the equation holds as presented. However, if there is a non-uniform flow velocity distribution the transverse velocity, $V_Z$, of different vertical layers in tube section 3 varies, due to the rotation of the section about the horizontal axis, as shown in FIG. 1. For a steady, asymmetrical flow velocity distribution, the reaction force equation can be modified to $F_M = C_V M V_T$, where $C_V$ is a calibration constant, depending on flow velocity distribution. $C_V$ is equal to one, when the velocity distribution is symmetrical. For both purely turbulent flow and purely laminar flow the flow velocity is symmetrical and no calibration factor is required. For transitional or mixed flows a calibration factor must be used; but because of the unsteady nature of such flows a single factor may be inadequate to provide desired measurement accuracy. The intended use of the disclosed tubular flowmeter is for the measurement of high flow rates at high flow velocities. Under most conditions the flow range will be well into the turbulent region, providing a symmetrical velocity distribution; and no calibration factor will be required. In order to minimize the error just described the transverse velocity should be made as uniform as possible over section 3. This can be achieved by making the radius, R, large compared to the equivalent flow tube diameter, for the case where transverse motion is achieved by rotation about a horizontal axis, or by moving section 3 in translation in the transverse direction. The latter method is used in the structure shown in FIG. 6.

Referring to FIGS. 6 and 7, the metering means consists of a housing 52 with an internal chamber 53, ports 54 and 55 connecting to opposite ends of flexible flow tube 56, an oscillative driving member, shown as a ring 57 around and attached to the flow tube 56, a linear electromagnetic driver 58 attached to the driving ring 57 and disposed to vibrate the ring in translation in a direction transverse to the plane of the section, a flexible hollow round shaft 59 attached to the driving ring 57, the shaft axis coinciding with the vertical center line of the device, a pair of strain gages, 60 and 61, mounted axially on shaft 59 so as to measure the bending of shaft 59 caused by vibratory deflection of flow tube 56 in a direction transverse to the plane of the section, and a second pair of strain gages, 62 and 63, mounted on shaft 59 at opposite angles of 45 degrees with respect to the shaft axis so as to measure the twist of shaft 59 caused by rotational deflection of flow tube 56 and driving ring 57 about the vertical center line. Strain gages 60 and 61 are arranged in an electrical bridge circuit 66 with fixed resistors 64 and 65. Strain gages 62 and 63 are arranged in an electrical bridge circuit 67 with fixed resistors 68 and 69. Both bridge circuits are energized by a constant direct voltage. The output of bridge 66 is an alternating voltage at vibration frequency with an amplitude proportional to the vibratory translation of driving ring 57 in the transverse direction. This voltage is fed through amplifier 70 to an automatic voltage control circuit 71 of conventional design, where it is used to modify the driver excitation voltage, $E_C$. The output of the automatic voltage control is fed to electromagnetic driver 58, through amplifier 72. By this means the translational displacement of vibration of ring 57 is maintained at a constant amplitude at excitation frequency. With minor modifications of the automatic voltage control and removal of excitation, $E_C$, the same circuitry can be used for self-excitation of the vibrating system at resonant frequency. The output of bridge 67 is an alternating voltage at vibration frequency with an amplitude proportional to the vibratory rotation of ring 57 about the vertical center line, hence the torque on shaft 59 caused by the force couple in tube 56 associated with mass flow. Thus the voltage is proportional to mass rate of flow through tube 56. This output voltage is fed to electronic voltmeter 73 which is calibrated to indicate in units of mass flow.

The embodiment of the invention shown in FIGS. 8, 9, and 10 is similar to that shown in FIG. 6, the essential difference being that the bent flow tube lies in a plane orthogonal to the direction of the inlet and outlet pipes. The device includes a housing 74, with an interior chamber 75, stationary inlet and outlet pipes 76 and 76A, leading fluid to and from a vibrating bent flow tube 77 through bellows 78 and 79, a flow tube driving ring 80 supported by link 81 pivoted on the inlet-outlet axis, a linear electromagnetic vibration driver 82 attached to ring 80 and two magnetic vibration velocity sensors 83 and 84. Flow tube 77 is similar to the one shown in FIG. 1 and consists of a straight section 85 within ring 80 and connected to the bellows by arms 86 and 87. Section 85 is vibrated in a direction transverse to the path of the fluid flowing through it. A force couple induced by mass flow causes the ends of section 85 to rotate about an axis through link 81. Sensors 83 and 84 are located at the ends of flow tube section 85. Their additive output is proportional to the amplitude of vibration of ring 80. Their differential output is proportional to the rotational motion of section 85, hence the reactive force couple; and, therefore, the mass flow rate.

Referring now to the electrical schematic diagram of FIG. 10, the additive output of the two sensors 83 and 84 is fed to summing amplifier 88. The output voltage of summing amplifier 88 is limited in value by automatic voltage control 89, which feeds coil 90 of electromagnetic driver 82 through amplifier 91 so as to maintain the amplitude of vibrational velocity of the driver constant.

The differential output of the two sensors 83 and 84 is also fed to a differential voltage amplifier 92, whose output in turn is fed to a voltmeter 93, calibrated to indicate mass rate of flow. The electrical components include a conventional induction type of watt-hour meter 94 for indicating the total mass flow through the meter from a given reference time. The alternating output of amplifier 92 is also fed to feedback amplifier 95 whose output is a current proportional to the output voltage of amplifier 92, hence to mass flow rate. This current is fed to a current transformer 96, whose output, a much larger current but still proportional to mass flow rate, is fed to the current coil 97 of the watt-hour meter. The alternating output of the differential voltage amplifier 92 is also fed to a phase adjusting network 98, whose output is delivered to an AC voltage regulator 99, which supplies an alternating voltage at vibration frequency of constant amplitude and in proper phase relation with the current in the current coil 97 to the voltage coil 100 of the watt-hour meter. The current transformer 96 is not essential; but is desirable for use with industrial watt-hour meters, which have relatively high capacities in comparison with the outputs of instrument amplifiers. The phase adjusting network 98 and voltage regulator 99 can be of any known design. Their inclusion is essential for assurance of high accuracy performance of the watt-hour meter compatible with the accuracy of the metering means.

What is claimed is:

1. Means of the Coriolis type for metering the rate of mass flow of matter in a line including a fixed member in the line having an inlet port and an outlet port with coplanar axes, a curved conduit with a flow path in a plane orthogonal to the plane of the port axes having a curvature between 0° and 180°, said conduit having an intermediate section movable in a direction perpendicular to the flow path therein, a bent inlet section providing an increasing gradient of fluid velocity in the direction of conduit motion, a bent outlet section providing a decreasing gradient of fluid velocity in the direction of conduit motion of equal magnitude and opposite direction to the velocity gradient in the bent inlet section, means to connect the bent inlet section of the conduit to the inlet port and the bent outlet section to the outlet port, means for moving the conduit to impart transverse angular momentum to the flowing matter in the bent inlet and outlet sections, and means for sensing the Coriolis force couple on the conduit about an axis perpendicular to its flow path and the direction of conduit motion due to the transverse momentum of the matter flowing therein as a measure of mass flow through the conduit.

References Cited

UNITED STATES PATENTS

| 2,813,423 | 11/1957 | Altfillisch et al. |
| 3,080,750 | 3/1963 | Wiley et al. |
| 3,276,257 | 10/1966 | Roth. |

FOREIGN PATENTS

| 120,018 | 2/1958 | U.S.S.R. |
| 149,900 | 12/1962 | U.S.S.R. |

CHARLES A. RUEHL, Primary Examiner